US008886172B2

(12) United States Patent
Gomez (10) Patent No.: US 8,886,172 B2
(45) Date of Patent: Nov. 11, 2014

(54) PROVIDING LOCATION INFORMATION USING MATRIX CODE

(75) Inventor: Mark H. Gomez, Parker, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 12/961,369

(22) Filed: Dec. 6, 2010

(65) Prior Publication Data

US 2012/0142322 A1 Jun. 7, 2012

(51) Int. Cl.
*H04L 29/06* (2006.01)
*G06F 17/30* (2006.01)
*G06K 19/06* (2006.01)
*H04W 4/04* (2009.01)
*H04W 4/02* (2009.01)
*G01C 21/36* (2006.01)
*H04M 1/725* (2006.01)
*H04W 4/18* (2009.01)
*H04M 1/2755* (2006.01)

(52) U.S. Cl.
CPC ........... *H04W 4/04* (2013.01); *G06F 17/30241* (2013.01); *G06K 19/06009* (2013.01); *H04W 4/02* (2013.01); *H04M 1/2755* (2013.01); *H04M 2250/52* (2013.01); *G01C 21/362* (2013.01); *H04M 1/72572* (2013.01); *H04W 4/18* (2013.01); *G01C 21/3623* (2013.01)
USPC ...................................................... 455/414.3

(58) Field of Classification Search
USPC ................... 455/404.2, 456.1, 457
See application file for complete search history.

(56) References Cited

U.S. PATENT DOCUMENTS

| 4,809,325 A | 2/1989 | Hayashi et al. |
| 4,837,414 A | 6/1989 | Edamula |
| 5,500,681 A | 3/1996 | Jones |
| 5,510,603 A | 4/1996 | Hess et al. |
| 5,581,636 A | 12/1996 | Skinger |
| 5,602,377 A | 2/1997 | Beller et al. |
| 5,703,349 A | 12/1997 | Meyerson et al. |
| 5,959,285 A | 9/1999 | Schuessler |

(Continued)

FOREIGN PATENT DOCUMENTS

| CN | 1571503 A | 1/2005 |
| CN | 101 227 581 A | 7/2008 |

(Continued)

OTHER PUBLICATIONS

"Android App Reviews & Showcase Just a Tapp Away," Android Tapp, 10 pp. Found online at http://www.androidtapp.com/download-the-weather-channel-android-app-from-your-tv/, Oct. 22, 2010.

(Continued)

*Primary Examiner* — Kwasi Karikari
(74) *Attorney, Agent, or Firm* — Kilpatrick Townsend & Stockton LLP (57) ABSTRACT

A method for providing a user of a mobile electronic device with information regarding the geographic location of a business entity. The method includes detecting, utilizing the mobile electronic mobile device, a matrix code. The matrix code is encoded with data relating to the business entity. The method further includes retrieving, utilizing the electronic mobile device, GPS data relating to any or all of a current geographic location of the electronic mobile device and a reference geographic location. The method further includes generating, utilizing the electronic mobile device, a request for location information with respect to the business entity.

20 Claims, 4 Drawing Sheets

(56) References Cited

U.S. PATENT DOCUMENTS

| | | |
|---|---|---|
| 5,978,855 A | 11/1999 | Metz et al. |
| 6,006,990 A | 12/1999 | Ye et al. |
| 6,058,238 A | 5/2000 | Ng |
| 6,438,751 B1 | 8/2002 | Voyticky et al. |
| 6,512,919 B2 | 1/2003 | Ogasawara |
| 6,556,273 B1 | 4/2003 | Wheeler et al. |
| 6,704,929 B1 | 3/2004 | Ozer et al. |
| 6,983,304 B2 | 1/2006 | Sato |
| 7,046,161 B2 | 5/2006 | Hayes |
| 7,206,029 B2 | 4/2007 | Cohen-Solal |
| 7,206,409 B2 | 4/2007 | Antonellis et al. |
| 7,221,405 B2 | 5/2007 | Basson et al. |
| 7,244,404 B2 | 7/2007 | Rosenberg et al. |
| 7,328,848 B2 | 2/2008 | Xia et al. |
| 7,349,668 B2 | 3/2008 | Ilan et al. |
| 7,369,180 B2 | 5/2008 | Xing |
| 7,387,250 B2 | 6/2008 | Muni |
| 7,394,519 B1 | 7/2008 | Mossman et al. |
| 7,424,976 B2 | 9/2008 | Muramatsu |
| 7,443,449 B2 | 10/2008 | Momosaki et al. |
| 7,487,527 B2 | 2/2009 | Ellis et al. |
| 7,587,601 B2 | 9/2009 | Levy et al. |
| 7,604,172 B2 | 10/2009 | Onogi |
| 7,612,748 B2 | 11/2009 | Tateuchi |
| 7,624,417 B2 | 11/2009 | Dua |
| 7,624,916 B2 | 12/2009 | Sato et al. |
| 7,673,297 B1 | 3/2010 | Arsenault et al. |
| 7,797,430 B2 | 9/2010 | Ichieda |
| 7,841,531 B2 | 11/2010 | Onogi |
| 8,010,977 B2 | 8/2011 | Hogyoku |
| 8,045,054 B2 | 10/2011 | Bishop et al. |
| 8,186,572 B2 | 5/2012 | Herzig |
| 8,292,166 B2 | 10/2012 | Gomez et al. |
| 8,364,018 B2 | 1/2013 | McArdle |
| 8,386,339 B2 | 2/2013 | Minnick et al. |
| 8,408,466 B2 | 4/2013 | Gratton |
| 8,427,455 B2 | 4/2013 | Matsuda |
| 8,430,302 B2 | 4/2013 | Minnick et al. |
| 8,439,257 B2 | 5/2013 | Beals et al. |
| 8,443,407 B2 | 5/2013 | Gaede et al. |
| 8,468,610 B2 | 6/2013 | Beals et al. |
| 8,511,540 B2 | 8/2013 | Anguiano |
| 8,534,540 B2 | 9/2013 | Gratton et al. |
| 8,550,334 B2 | 10/2013 | Gratton et al. |
| 8,553,146 B2 | 10/2013 | Kennedy |
| 2001/0037297 A1 | 11/2001 | McNair |
| 2001/0052133 A1 | 12/2001 | Pack et al. |
| 2002/0027612 A1 | 3/2002 | Brill et al. |
| 2002/0049980 A1 | 4/2002 | Hoang |
| 2002/0112250 A1 | 8/2002 | Koplar et al. |
| 2003/0018711 A1* | 1/2003 | Imanishi ................... 709/203 |
| 2003/0050854 A1 | 3/2003 | Showghi et al. |
| 2003/0121978 A1 | 7/2003 | Rubin et al. |
| 2003/0172374 A1 | 9/2003 | Vinson et al. |
| 2004/0019691 A1 | 1/2004 | Daymond et al. |
| 2004/0026508 A1 | 2/2004 | Nakajima et al. |
| 2004/0044532 A1 | 3/2004 | Karstens |
| 2004/0046790 A1 | 3/2004 | Agarwal et al. |
| 2005/0011958 A1 | 1/2005 | Fukasawa et al. |
| 2005/0015800 A1 | 1/2005 | Holcomb |
| 2005/0015815 A1 | 1/2005 | Shoff et al. |
| 2005/0055281 A1 | 3/2005 | Williams |
| 2005/0059339 A1 | 3/2005 | Honda et al. |
| 2005/0125301 A1 | 6/2005 | Muni |
| 2005/0149967 A1 | 7/2005 | Hanley et al. |
| 2005/0180804 A1 | 8/2005 | Andrew et al. |
| 2005/0262548 A1 | 11/2005 | Shimojo et al. |
| 2005/0264694 A1 | 12/2005 | Ilan et al. |
| 2006/0064700 A1 | 3/2006 | Ludvig et al. |
| 2006/0071076 A1 | 4/2006 | Tamayama |
| 2006/0079247 A1* | 4/2006 | Ritter ................... 455/456.1 |
| 2006/0086796 A1 | 4/2006 | Onogi |
| 2006/0095286 A1 | 5/2006 | Kimura |
| 2006/0124742 A1 | 6/2006 | Rines et al. |
| 2006/0196950 A1 | 9/2006 | Kiliccote |
| 2006/0203339 A1 | 9/2006 | Kleinberger et al. |
| 2006/0208088 A1 | 9/2006 | Sekiguchi |
| 2006/0265731 A1 | 11/2006 | Matsuda |
| 2007/0016934 A1 | 1/2007 | Okada et al. |
| 2007/0016936 A1 | 1/2007 | Okada et al. |
| 2007/0017350 A1 | 1/2007 | Uehara |
| 2007/0019215 A1 | 1/2007 | Yu |
| 2007/0063050 A1 | 3/2007 | Attia et al. |
| 2007/0073585 A1 | 3/2007 | Apple et al. |
| 2007/0143788 A1 | 6/2007 | Abernathy et al. |
| 2007/0192723 A1 | 8/2007 | Anzelde et al. |
| 2007/0206020 A1 | 9/2007 | Duffield et al. |
| 2007/0256118 A1 | 11/2007 | Nomura et al. |
| 2008/0022323 A1 | 1/2008 | Koo |
| 2008/0059998 A1 | 3/2008 | McClenny et al. |
| 2008/0062164 A1 | 3/2008 | Bassi et al. |
| 2008/0073434 A1 | 3/2008 | Epshteyn et al. |
| 2008/0077324 A1 | 3/2008 | Hatano et al. |
| 2008/0082684 A1 | 4/2008 | Gaos et al. |
| 2008/0092154 A1 | 4/2008 | Hogyoku |
| 2008/0112615 A1 | 5/2008 | Obrea et al. |
| 2008/0156879 A1 | 7/2008 | Melick et al. |
| 2008/0182561 A1 | 7/2008 | Kim et al. |
| 2008/0189185 A1 | 8/2008 | Matsuo et al. |
| 2008/0200153 A1 | 8/2008 | Fitzpatrick et al. |
| 2008/0200160 A1* | 8/2008 | Fitzpatrick et al. .......... 455/418 |
| 2008/0201078 A1 | 8/2008 | Fitzpatrick et al. |
| 2008/0244675 A1 | 10/2008 | Sako et al. |
| 2008/0267537 A1 | 10/2008 | Thuries |
| 2008/0281624 A1 | 11/2008 | Shibata |
| 2008/0288600 A1 | 11/2008 | Clark |
| 2008/0307348 A1 | 12/2008 | Jones et al. |
| 2009/0029725 A1 | 1/2009 | Kindberg |
| 2009/0031071 A1 | 1/2009 | Chiu |
| 2009/0031373 A1 | 1/2009 | Hogyoku |
| 2009/0070699 A1 | 3/2009 | Birkill et al. |
| 2009/0083808 A1 | 3/2009 | Morrison |
| 2009/0088213 A1 | 4/2009 | Rofougaran |
| 2009/0094546 A1 | 4/2009 | Anzelde et al. |
| 2009/0108057 A1 | 4/2009 | Mu et al. |
| 2009/0113334 A1 | 4/2009 | Chakra et al. |
| 2009/0154759 A1 | 6/2009 | Koskinen et al. |
| 2009/0157511 A1 | 6/2009 | Spinnell et al. |
| 2009/0157530 A1 | 6/2009 | Nagamoto et al. |
| 2009/0172780 A1 | 7/2009 | Sukeda et al. |
| 2009/0179852 A1 | 7/2009 | Refai et al. |
| 2009/0180025 A1 | 7/2009 | Dawson |
| 2009/0212112 A1 | 8/2009 | Li et al. |
| 2009/0212113 A1 | 8/2009 | Chiu et al. |
| 2009/0234570 A1* | 9/2009 | Sever ................... 701/200 |
| 2009/0254954 A1 | 10/2009 | Jeong |
| 2009/0294538 A1 | 12/2009 | Wihlborg et al. |
| 2009/0303036 A1 | 12/2009 | Sahuguet |
| 2009/0307232 A1 | 12/2009 | Hall |
| 2009/0312105 A1 | 12/2009 | Koplar |
| 2010/0017457 A1 | 1/2010 | Jumpertz et al. |
| 2010/0020970 A1 | 1/2010 | Liu et al. |
| 2010/0031162 A1 | 2/2010 | Wiser et al. |
| 2010/0036936 A1 | 2/2010 | Cox et al. |
| 2010/0053339 A1 | 3/2010 | Aaron et al. |
| 2010/0081375 A1 | 4/2010 | Rosenblatt et al. |
| 2010/0089996 A1 | 4/2010 | Koplar |
| 2010/0096448 A1 | 4/2010 | Melick et al. |
| 2010/0103018 A1 | 4/2010 | Yoon et al. |
| 2010/0114715 A1 | 5/2010 | Schuster et al. |
| 2010/0129057 A1 | 5/2010 | Kulkarni |
| 2010/0131900 A1 | 5/2010 | Spetalnick |
| 2010/0131970 A1 | 5/2010 | Falcon |
| 2010/0131983 A1 | 5/2010 | Shannon et al. |
| 2010/0149187 A1 | 6/2010 | Slavin et al. |
| 2010/0154035 A1 | 6/2010 | Damola et al. |
| 2010/0161437 A1 | 6/2010 | Pandey |
| 2010/0163613 A1 | 7/2010 | Bucher et al. |
| 2010/0201894 A1 | 8/2010 | Nakayama et al. |
| 2010/0217663 A1 | 8/2010 | Ramer et al. |
| 2010/0225653 A1 | 9/2010 | Sao et al. |
| 2010/0261454 A1 | 10/2010 | Shenfield et al. |
| 2010/0262924 A1 | 10/2010 | Kalu |
| 2010/0262992 A1 | 10/2010 | Casagrande |

(56) References Cited

U.S. PATENT DOCUMENTS

| | | | |
|---|---|---|---|
| 2010/0272193 A1 | 10/2010 | Khan et al. |
| 2010/0275010 A1 | 10/2010 | Ghirardi |
| 2010/0279710 A1 | 11/2010 | Dicke et al. |
| 2010/0295868 A1 | 11/2010 | Zahnert et al. |
| 2010/0301115 A1 | 12/2010 | Berkun |
| 2010/0313231 A1 | 12/2010 | Okamoto et al. |
| 2010/0319041 A1 | 12/2010 | Ellis |
| 2010/0327060 A1 | 12/2010 | Moran et al. |
| 2011/0000958 A1 | 1/2011 | Herzig |
| 2011/0007218 A1 | 1/2011 | Moran et al. |
| 2011/0030068 A1 | 2/2011 | Imai |
| 2011/0039573 A1* | 2/2011 | Hardie ................ 455/456.1 |
| 2011/0061003 A1 | 3/2011 | Miyazawa et al. |
| 2011/0065451 A1* | 3/2011 | Danado et al. ........ 455/456.1 |
| 2011/0087539 A1 | 4/2011 | Rubinstein et al. |
| 2011/0107386 A1 | 5/2011 | De Los Reyes et al. |
| 2011/0138408 A1 | 6/2011 | Adimatyam et al. |
| 2011/0208710 A1 | 8/2011 | Lesavich |
| 2011/0258058 A1 | 10/2011 | Carroll et al. |
| 2011/0264527 A1 | 10/2011 | Fitzpatrick et al. |
| 2011/0264530 A1 | 10/2011 | Santangelo et al. |
| 2011/0282727 A1 | 11/2011 | Phan et al. |
| 2011/0314485 A1 | 12/2011 | Abed |
| 2012/0096499 A1 | 4/2012 | Dasher et al. |
| 2012/0127110 A1 | 5/2012 | Amm et al. |
| 2012/0128267 A1 | 5/2012 | Dugan et al. |
| 2012/0130835 A1 | 5/2012 | Fan et al. |
| 2012/0130851 A1 | 5/2012 | Minnick et al. |
| 2012/0131416 A1 | 5/2012 | Dugan et al. |
| 2012/0137318 A1 | 5/2012 | Kilaru et al. |
| 2012/0138671 A1 | 6/2012 | Gaede et al. |
| 2012/0139826 A1 | 6/2012 | Beals et al. |
| 2012/0139835 A1 | 6/2012 | Morrison et al. |
| 2012/0151293 A1 | 6/2012 | Beals |
| 2012/0151524 A1 | 6/2012 | Kilaru et al. |
| 2012/0153015 A1 | 6/2012 | Gomez et al. |
| 2012/0153017 A1 | 6/2012 | Bracalente et al. |
| 2012/0155838 A1 | 6/2012 | Gerhards et al. |
| 2012/0158919 A1 | 6/2012 | Aggarwal et al. |
| 2012/0159563 A1 | 6/2012 | Gomez et al. |
| 2012/0168493 A1 | 7/2012 | Worms |
| 2012/0168510 A1 | 7/2012 | Gratton |
| 2012/0169928 A1 | 7/2012 | Casagrande et al. |
| 2012/0175416 A1 | 7/2012 | Gomez et al. |
| 2012/0181329 A1 | 7/2012 | Gratton et al. |
| 2012/0182320 A1 | 7/2012 | Beals et al. |
| 2012/0188112 A1 | 7/2012 | Beals et al. |
| 2012/0188442 A1 | 7/2012 | Kennedy |
| 2012/0198572 A1 | 8/2012 | Beals et al. |
| 2012/0199643 A1 | 8/2012 | Minnick et al. |
| 2012/0206648 A1 | 8/2012 | Casagrande et al. |
| 2012/0215830 A1 | 8/2012 | Anguiano |
| 2012/0217292 A1 | 8/2012 | Gratton et al. |
| 2012/0217293 A1 | 8/2012 | Martch et al. |
| 2012/0218470 A1 | 8/2012 | Schaefer |
| 2012/0218471 A1 | 8/2012 | Gratton |
| 2012/0222055 A1 | 8/2012 | Schaefer et al. |
| 2012/0222071 A1 | 8/2012 | Gaede et al. |
| 2012/0222081 A1 | 8/2012 | Schaefer et al. |
| 2012/0293327 A1 | 11/2012 | Mountain |
| 2013/0068838 A1 | 3/2013 | Gomez et al. |
| 2013/0239157 A1 | 9/2013 | Gaede et al. |
| 2014/0076963 A1 | 3/2014 | Gratton et al. |

FOREIGN PATENT DOCUMENTS

| | | |
|---|---|---|
| DE | 10 2007 038 810 A1 | 2/2009 |
| EP | 1 021 035 A1 | 7/2000 |
| EP | 1 383 071 A2 | 1/2004 |
| EP | 1 724 695 A1 | 11/2006 |
| EP | 1 757 222 A1 | 2/2007 |
| EP | 1 768 400 A2 | 3/2007 |
| EP | 2 079 051 A1 | 7/2009 |
| EP | 2 131 289 A1 | 12/2009 |
| EP | 2 439 936 A2 | 4/2012 |
| FR | 2 565 748 A1 | 12/1985 |
| GB | 2 044 446 A | 10/1980 |
| GB | 2 165 129 A | 4/1986 |
| GB | 2 311 451 A | 9/1997 |
| GB | 2 325 765 A | 12/1998 |
| GB | 2 471 567 A | 1/2011 |
| JP | 2002-215768 A | 8/2002 |
| JP | 2007-213548 A | 8/2007 |
| JP | 2008 244556 A | 10/2008 |
| KR | 2004 0087776 A | 10/2004 |
| WO | 95/27275 A1 | 10/1995 |
| WO | 97/41690 A1 | 11/1997 |
| WO | 01/06593 A2 | 1/2001 |
| WO | 01/18589 A1 | 3/2001 |
| WO | 01/58146 A2 | 8/2001 |
| WO | 2005/109338 A1 | 11/2005 |
| WO | 2007/009005 A1 | 1/2007 |
| WO | 2009/057651 | 5/2009 |
| WO | 2009/144536 A1 | 12/2009 |
| WO | 2010/149161 A1 | 12/2010 |
| WO | 2011/009055 A2 | 1/2011 |

OTHER PUBLICATIONS

"Can Mobile Barcodes Work on TV?," India and Asia Pacific Mobile Industry Reports, Sep. 2009, 4 pp. Found online at http://www.gomonews.com/can-mobile-barcodes-work-on-tv/, Oct. 22, 2010.

"FOX TV Uses QR Codes," 2d Barcode Strategy, Sep. 2010, 6 pp. Found online at http://www.2dbarcodestrategy.com/2010/09/fox-tv-uses-qr-codes.html, Oct. 22, 2010.

"FOX's Fringe Uses QR Code," 2d Barcode Strategy, Oct. 2010, 4 pp. Found on the Internet at http://www.2dbarcodestrategy.com/2010/10/foxs-fringe-uses-qr-code.html, Oct. 22, 2010.

"Mobile Paths: QR Codes Come to TV," Mobile Behavior: An Omnicom Group Company, Sep. 2010, 8 pp. Found online at http://www.mobilebehavior.com/2010/09/27/mobile-paths-qr-codes-come-to-tv, Oct. 22, 2010.

"What Can I Do with the QR Barcode," Search Magnet Local-QR Barcode Technology, 2 pp. Found online at http://www.searchmagnetlocal.com/qr_barcode_technology.html, Oct. 22, 2010.

Kartina Costedio, "Bluefly QR Codes Debut on TV," 2 pp. Found online at http://www.barcode.com/Mobile-Barcode-News/bluefly-qr-codes-debut-on-tv.html, Oct. 22, 2010.

Gao, J. et al., "A 2D Barcode-Based Mobile Payment System," Multimedia and Ubiquitous Engineering, 2009, 10 pp. Found online at http://ieeexplore.ieee.org/Xplore/login.jsp?url=http%3A%2F%2Fieeexplore.ieee.org%2Fie . . . , Oct. 22, 2010.

Smith, Lindsay, "Barcodes Make History on Global TV", 3 pp. Found online at http://www.lindsaysmith.com/worlds-first-mobio-mini-telethon/, Oct. 22, 2010.

Nghee, Seah Y. , "Data Transmission Between PDA and PC Using WIFI for Pocket Barcode Application", Thesis, University Teknologi Malaysia, May 2007, 126 pp. Found online at http://eprints.utm.my/6421/1/SeahYeowNgeeMFKE20007TTT.pdf, Oct. 22, 2010.

Olson, Elizabeth, "Bar Codes Add Detail on Items in TV Ads," New York Times, Sep. 2010, 3 pp. Found online at http:www.nytimes.com/2010/09/27/business/media/27bluefly.html?src=busln, Oct. 22, 2010.

Rekimoto, Jun et al., "Augment-able Reality: Situated Communication Through Physical and Digital Spaces", Sony Computer Science Laboratory, 2002, 8 pp. Found online at Citeseer: 10.1.1.20.34[1].pdf, Oct. 22, 2010.

Silverstein, Barry, "QR Codes and TV Campaigns Connect," ReveNews, Sep. 2010, 5 pp. Found online at http://www.revenews.com/barrysilverstein/qr-codes-and-tv-campaigns-connect/, Oct. 22, 2010.

Yamanari, Tomofumi et al., "Electronic Invisible Code Display Unit for Group Work on Reminiscence Therapy," Proceedings of the International MultiConference of Engineers and Computer Scientists 2009, vol. I, IMECS 2009, Mar. 2009, 6 pp. Retrieved from Internet: http://citeseerx.ist.psu.edu/viewdoc/download?doi=10.1.1.148.6904&rep1&type=pdf.

(56) References Cited

OTHER PUBLICATIONS

Byford, D., "Universal Interactive Device," International Business Machines Corporation, Jun. 1998, 1 page.
International Search Report and Written Opinion of PCT/US11/60094 mailed on Mar. 30, 2012, 7 pages.
International Search Report of PCT/US11/60109 mailed on Feb. 14, 2012, 3 pages.
International Search Report and Written Opinion of PCT/US2011/068161 mailed on Jun. 14, 2012, 19 pages.
International Search Report and Written Opinion of PCT/US2012/021657 mailed on May 23, 2012, 12 pages.
International Search Report and Written Opinion of PCT/US2012/022405 mailed on Apr. 19, 2012, 11 pages.
International Search Report and Written Opinion of PCT/US2012/024923 mailed on May 22, 2012, 12 pages.
International Search Report and Written Opinion of PCT/US2012/024956 mailed on Jun. 11, 2012, 10 pages.
International Search Report and Written Opinion of PCT/US2012/025502 mailed Jun. 8, 2012, 13 pages.
International Search Report and Written Opinion of PCT/US2012/025607 mailed Jun. 8, 2012, 13 pages.
International Search Report and Written Opinion of PCT/US2012/025634 mailed on May 7, 2012, 8 pages.
International Search Report and Written Opinion of PCT/US2012/026373 mailed Jun. 13, 2012, 14 pages.
International Search Report and Written Opinion of PCT/US2012/026722 mailed Jun. 28, 2012, 11 pages.
Schmitz, A., et al., "Ad-Hoc Multi-Displays for Mobile Interactive Applications," 31st Annual Conference of the European Association for Computer Graphics (Eurographics 2010), May 2010, vol. 29, No. 2, 8 pages.
Yang, C., et al., "Embedded Digital Information Integrated by Video-on-Demand System," Proceedings of the Fourth International Conference on Networked Computing and Advanced Information Management, IEEE Computer Society, 2008, 6 pages.
U.S. Appl. No. 12/971,349, filed Dec. 17, 2010, Office Action mailed Jul. 16, 2012, 11 pages.
U.S. Appl. No. 12/984,385, filed Jan. 4, 2011, Office Action mailed Jul. 12, 2012, 16 pages.
U.S. Appl. No. 12/986,721, filed Jan. 7, 2011, Notice of Allowance mailed Jun. 21, 2012, 7 pages.
U.S. Appl. No. 13/020,678, filed Feb. 3, 2011, Office Action mailed Jul. 30, 2012, 15 pages.
U.S. Appl. No. 13/035,525, filed Feb. 25, 2011, Office Action mailed Jul. 18, 2012, 15 pages.
International Preliminary Report on Patentability of PCT/US2011/059977 mailed on Jun. 6, 2013, 6 pages.
International Preliminary Report on Patentability of PCT/US2011/068161 mailed on Jul. 25, 2013, 13 pages.
International Preliminary Report on Patentability of PCT/US2012/025502 mailed Sep. 6, 2013, 9 pages.
Liu, Yue et al., "Recognition of QR code with mobile phones," Control and Decision Conference, 2008. CCDC 2008. Jul. 2-4, 2008, pp. 203, 206.
U.S. Appl. No. 12/964,478, filed Dec. 9, 2010, Final Office Action mailed Sep. 16, 2013, 12 pages.
U.S. Appl. No. 12/961,369, filed Dec. 6, 2010, Non-Final Office Action mailed Mar. 25, 2013, 17 pages.
U.S. Appl. No. 12/971,349, filed Dec. 7, 2010, Notice of Allowance mailed Oct. 2, 2013, 24 pages.
U.S. Appl. No. 12/981,244, filed Dec. 29, 2010, Final Office Action mailed Oct. 30, 2013, 10 pages.
U.S. Appl. No. 13/016,483, filed Jan. 28, 2011 Final Office Action mailed Jun. 27, 2013, 13 pages.
U.S. Appl. No. 12/965,645, filed Dec. 10, 2010, Non-Final Office Action, mailed Jul. 19, 2013, 20 pages.
U.S. Appl. No. 12/973,431, filed Dec. 20, 2010, Final Office Action mailed Aug. 27, 2013, 11 pages.
U.S. Appl. No. 13/006,270, filed Jan. 13, 2011, Non-Final Office Action mailed Oct. 8, 2013, 20 pages.
U.S. Appl. No. 13/028,030, filed Feb. 15, 2011, Non-Final Office Action mailed Dec. 17, 2013, 60 pages.
U.S. Appl. No. 13/035,525, filed Feb. 25, 2011, Final Office Action mailed Sep. 12, 2013, 21 pages.
U.S. Appl. No. 13/037,302, filed Feb. 28, 2011 Final Office Action mailed Oct. 16, 2013, 28 pages.
U.S. Appl. No. 13/037,316, filed Feb. 28, 2011, Final Office Action mailed Aug. 28, 2013, 13 pages.
U.S. Appl. No. 13/192,287, filed Jul. 27, 2011 Non Final Office Action mailed Jun. 13, 2013, 22 pages.
U.S. Appl. No. 13/673,480, filed Nov. 9, 2012 Final Office Action mailed Sep. 9, 2013, 10 pages.
U.S. Appl. No. 13/673,480, filed Nov. 9, 2012 Notice of Allowance mailed Nov. 12, 2013, 16 pages.
U.S. Appl. No. 13/475,794, filed May 18, 2012 Non-Final Office Action mailed Sep. 18, 2013, 19 pages.
International Search Report of PCT/US2012/022581 mailed on Oct. 8, 2012, 18 pages.
International Search Report and Written Opinion of PCT/US2012/048032, mailed Oct. 16, 2012, 14 pages.
O'Sullivan, "Can Mobile Barcodes Work on TV?," India and Asia Pacific Mobile Industry Reports, Sep. 2009, 4 pp. Found online at http://gomonews.com/can-mobile-barcodes-work-on-tv/, Feb. 5, 2013.
U.S. Appl. No. 12/958,073, filed Dec. 1, 2010, Notice of Allowance mailed Jan. 17, 2013, 17 pages.
U.S. Appl. No. 12/981,244, filed Dec. 29, 2010, Office Action mailed Dec. 21, 2012, 23 pages.
U.S. Appl. No. 13/015,382, filed Jan. 27, 2011, Notice of Allowance mailed Feb. 22, 2013, 12 pages.
U.S. Appl. No. 13/007,317, filed Jan. 14, 2011, Office action mailed Dec. 19, 2012, 29 pages.
U.S. Appl. No. 13/020,678, filed Feb. 3, 2011, Notice of Allowance mailed Jan. 3, 2013, 13 pages.
U.S. Appl. No. 13/028,030, filed Feb. 15, 2011, Office Action mailed Jan. 11, 2013, 14 pages.
U.S. Appl. No. 13/035,525, filed Feb. 25, 2011, Final Office Action mailed Jan. 31, 2013, 26 pages.
U.S. Appl. No. 13/037,302, filed Feb. 28, 2011 Office Action mailed Mar. 1, 2013, 20 pages.
U.S. Appl. No. 13/037,312, filed Feb. 28, 2011, Final Office Action mailed Feb. 28, 2013, 18 pages.
U.S. Appl. No. 13/037,316, filed Feb. 28, 2011, Office Action mailed Jan. 30, 2013, 21 pages.
U.S. Appl. No. 13/037,333, filed Feb. 28, 2011 Notice of Allowance mailed Jan. 18, 2013, 27 pages.
U.S. Appl. No. 13/673,480, filed Nov. 9, 2012 Office Action mailed Jan. 16, 2013, 27 pages.
U.S. Appl. No. 12/964,478, filed Dec. 9, 2010, Non-Final Office Action mailed Mar. 26, 2013, 19 pages.
U.S. Appl. No. 12/953,227, filed Nov. 23, 2010, Final Office Action mailed May 24, 2013, 17 pages.
U.S. Appl. No. 12/973,431, filed Dec. 20, 2010, Non-Final Rejection mailed May 15, 2013, 30 pages.
U.S. Appl. No. 13/007,317, Notice of Allowance mailed May 13, 2013, 16 pages.
U.S. Appl. No. 13/031,115, Notice of Allowance mailed Apr. 16, 2013, 24 pages.
U.S. Appl. No. 13/034,482, filed Feb. 24, 2011, Final Office Action mailed Apr. 25, 2013, 19 pages.
U.S. Appl. No. 13/035,474, filed Feb. 25, 2011, Final Rejection mailed Mar. 29, 2013, 20 pages.
U.S. Appl. No. 12/960,285, filed Dec. 3, 2010, Final Office Action mailed Apr. 18, 2013, 14 pages.
U.S. Appl. No. 13/035,525, filed Feb. 25, 2011, Non-Final Office Action mailed May 15, 2013, 15 pages.
U.S. Appl. No. 13/014,591, Notice of Allowance mailed May 24, 2013, 32 pages.
U.S. Appl. No. 13/010,557, filed Jan. 20, 2011, Final Rejection mailed Jan. 16, 2014, 17 pages.
U.S. Appl. No. 13/010,557, filed Jan. 20, 2011, Non-Final Rejection mailed Aug. 5, 2013, 17 pages.

(56) References Cited

OTHER PUBLICATIONS

U.S. Appl. No. 13/192,287, filed Jul. 27, 2011, Final Office Action mailed Jan. 28, 2014, 18 pages.
U.S. Appl. No. 13/035,474, filed Feb. 25, 2011, Non Final Rejection mailed Mar. 6, 2014, 20 pages.
U.S. Appl. No. 12/965,645, filed Dec. 10, 2010, Final Office Action, mailed Mar. 18, 2014, 24 pages.
U.S. Appl. No. 13/037,312, filed Feb. 28, 2011, Notice of Allowance mailed Jun. 13, 2013, 10 pages.
U.S. Appl. No. 13/968,611, filed Aug. 16, 2013, Non-Final Office Action mailed Jan. 17, 2014, 21 pages.
Extended European Search Report for EP 12152690.9 dated Jun. 19, 2012, 9 pages.
International Search Report and Written Opinion of PCT/US2012/026624 mailed Aug. 29, 2012, 14 pages.
U.S. Appl. No. 12/958,073, filed Dec. 1, 2010, Office Action mailed Aug. 31, 2012, 12 pages.
U.S. Appl. No. 12/971,349, filed Dec. 7, 2010, Final Rejection mailed Oct. 24, 2012, 11 pages.
U.S. Appl. No. 12/953,227, filed Nov. 23, 2010, Office Action mailed Nov. 7, 2012, 31 pages.
U.S. Appl. No. 13/015,382, filed Jan. 27, 2011, Office Action Mailed Nov. 13, 2012, 7 pages.
U.S. Appl. No. 13/016,483, filed Jan. 28, 2011 Office Action mailed Nov. 2, 2012, 18 pages.
U.S. Appl. No. 12/953,273, filed Nov. 23, 2010, Notice of Allowance, mailed Oct. 18, 2012, 11 pages.
U.S. Appl. No. 13/034,482, filed Feb. 24, 2011, Office Action mailed Oct. 19, 2012, 11 pages.
U.S. Appl. No. 13/035,474, filed Feb. 25, 2011, Office Action mailed Oct. 30, 2012, 11 pages.
U.S. Appl. No. 12/960,285, filed Dec. 3, 2010, Final Office Action mailed Dec. 6, 2012, 17 pages.
U.S. Appl. No. 12/984,385, filed Jan. 4, 2011, Notice of Allowance mailed Nov. 28, 2012, 11 pages.
U.S. Appl. No. 13/037,312, filed Feb. 28, 2011, Office Action mailed Aug. 15, 2012, 9 pages.
International Search Report and Written Opinion of PCT/US11/59977 mailed on Mar. 19, 2012, 7 pages.
International Search Report and Written Opinion of PCT/US11/60002 mailed on Feb. 15, 2012, 7 pages.
International Search Report and Written Opinion of PCT/US11/60104 mailed on Mar. 29, 2012, 9 pages.
International Search Report and Written Opinion of PCT/US11/60121 mailed on Feb. 14, 2012, 7 pages.
International Search Report and Written Opinion of PCT/US11/61074 mailed on Jan. 6, 2012, 11 pages.
International Search Report and Written Opinion of PCT/US11/61211 mailed on Mar. 29, 2012, 8 pages.
International Search Report and Written Opinion of PCT/US11/61773 mailed on Feb. 21, 2012, 7 pages.
International Search Report and Written Opinion of PCT/US11/61778 mailed on Mar. 2, 2012, 7 pages.
International Search Report and Written Opinion of PCT/US11/63111 mailed on Apr. 4, 2012, 9 pages.
International Search Report and Written Opinion of PCT/US11/64709 mailed on Apr. 10, 2012, 8 pages.
International Search Report and Written Opinion of PCT/US2011/060098 mailed on Mar. 29, 2012, 10 pages.
International Search Report and Written Opinion of PCT/US2011/063308 mailed on Mar. 29, 2012, 10 pages.
International Search Report and Written Opinion of PCT/US2011/068176 mailed on Mar. 29, 2012, 15 pages.
Ngee, S., "Data Transmission Between PDA and PC Using WiFi for Pocket Barcode Application," Thesis, University Teknologi Malaysia, May 2007, 126 pp. Found online at http://eprints.utm.my/6421/1/SeahYeowNgeeMFKE20007TTT.pdf, Oct. 22, 2010.
U.S. Appl. No. 12/971,349, filed Dec. 17, 2010, Office Action mailed Nov. 10, 2011, 9 pages.
U.S. Appl. No. 12/971,349, filed Dec. 17, 2010, Final Office Action mailed Jan. 20, 2012, 10 pages.
U.S. Appl. No. 12/986,721, filed Jan. 7, 2011, Office Action mailed Mar. 16, 2012, 6 pages.

\* cited by examiner

PROVIDING LOCATION INFORMATION USING MATRIX CODE

FIELD OF THE INVENTION

The present disclosure relates to systems and methods for mobile wireless communications and more particularly to systems and method for providing location and/or navigational data to users of mobile wireless communication devices using matrix code.

SUMMARY

In one embodiment, the present disclosure relates to a method for providing a user of a mobile electronic device with information regarding the geographic location of a business entity. The method includes detecting, utilizing the mobile electronic mobile device, a matrix code. The matrix code is encoded with data relating to the business entity. The method further includes retrieving, utilizing the electronic mobile device, GPS data relating to any or all of a current geographic location of the electronic mobile device and a reference geographic location. The method further includes generating, utilizing the electronic mobile device, a request for location information with respect to the business entity. The request for location information may include business entity identifying information and GPS data.

In one embodiment, the present disclosure relates to a system for providing location information pertaining to a particular business entity. The system includes a mobile device. The mobile device includes an optical input device configured to optically detect a machine readable code, a position determination system configured to acquire GPS data, and a processing unit communicably coupled to the optical input device and the GPS receiver. The machine readable code includes information relating to the particular business entity. The processing unit is provided with computer implemented instructions to decode the machine readable code and generate for transmission over a network a location information request that includes at least a portion of the information relating to the particular business entity and GPS data.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

The description that follows includes sample systems, methods, and computer program products that embody various elements of the present disclosure. However, it should be understood that the described disclosure may be practiced in a variety of forms in addition to those described herein.

The present disclosure relates to systems and methods for mobile wireless communications and more particularly to systems and method for providing location and/or navigational data to users of mobile wireless communication devices using matrix code.

Typically, advertisements are intended to generate consumer interest for a business entity's products and/or services. For an advertising business entity having one or more "brick and mortar" facilities, often times it is necessary for the targeted consumer to travel to one of these facilities to carry-out a transaction. Therefore, it is desirable for advertisers to provide the targeted consumer with fast and convenient access to information regarding the location of the "brick and mortar" facilities that are nearest and/or most accessible to the targeted consumer.

Mobile devices carried by consumers often have the ability to determine their location, such as through the use of GPS. Moreover, these mobile devices are often equipped with the capability to transmit and receive data over a network. The present disclosure relates to systems and methods that utilize the GPS and data transmission capabilities of mobile devices to provide consumers with convenient access to information regarding the location of a business entity and/or its facilities.

Figure 1:
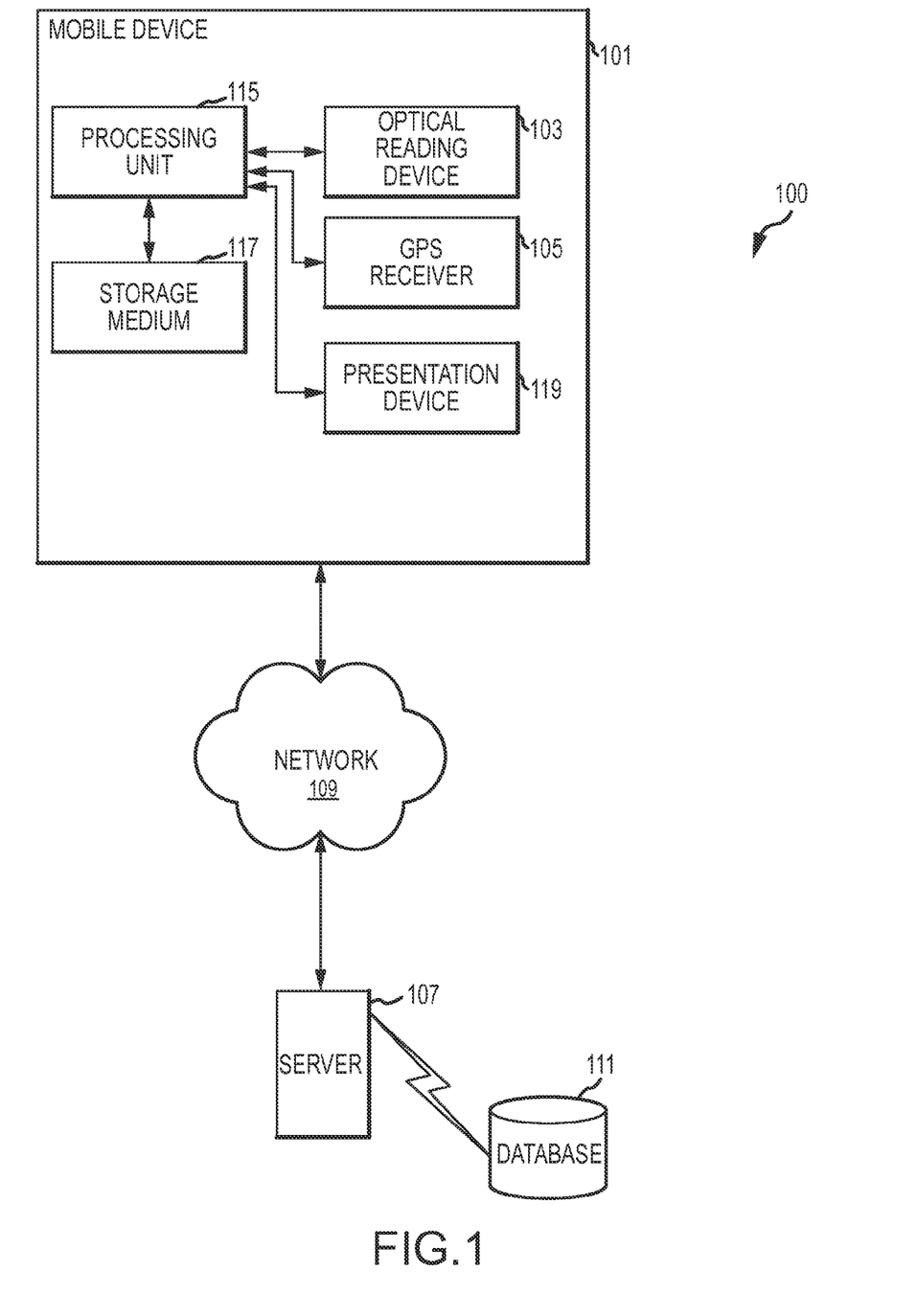
FIG. 1 is a block diagram illustrating a system for providing a user with information regarding the geographic location of a business entity or business entity facility using a matrix code.

FIG. 1 is a block diagram illustrating a system 100 for providing a user with information regarding the geographic location of a business entity or business entity facility using a matrix code. As used herein, "business entity" may refer to any type of business such as, for example, retailers, service providers, financial institutions, and the like. In some embodiments, the system 100 may include a mobile device 101, which may be equipped with an optical reading device 103 and a GPS receiver 105, in communication with a server 107 over a network 109.

In various embodiments, the mobile device 101 may be any mobile wireless client device, e.g., a cell phone, pager, a personal digital assistant, a tablet device, a mobile computer, or the like, capable of transmitting data over a network. The mobile device 101 may include one or more processing units 115, one or more non-transitory storage media 117, and one or more presentation devices 119 (such as a display screen, a speaker, and the like). The processing unit 115 may direct the overall operation of mobile device 101. A computer program or set of instructions may be coded or otherwise implemented on the processing unit 115 to enable the processing unit 115 to carry out the device operation. As will be described in more detail below, the processing unit 115 may retrieve and/or process information from the optical reading device 103 and the GPS receiver 105 and transmit this information over the network 109 to the server 107. In one embodiment, an Internet or World Wide Web ("Web") browser may be coded into, or otherwise accessed by, the processing unit 115 and used as an application for the mobile device 101. Alternatively, any suitable application and/or operating system may be employed.

In illustrative embodiments, the storage media 117 may interface with the processing unit 115 and may store program code and provide storage space for data useful in executing the program code and carrying out mobile device functions. The storage media 117 may take the form of, without limitation: a magnetic storage medium; optical storage medium; magneto-optical storage medium; read only memory; random access memory; erasable programmable memory; flash memory; and so on). The features and functionality of the systems and methods of the present disclosure described below may be implemented using hardware, software or a combination of hardware and software. If implemented as software, the software may run on the one or more of the processing units 115 or be stored in the storage media 117.

In illustrative embodiments, the mobile device 101 may include an optical reading device 103 such as, for example, a camera, a laser scanner, or the like. The optical reading device 103 may be integrated into the mobile device 101 or provided as a separate component in communication with the mobile device 101. The optical reading device 103 may be configured to detect and/or record a machine readable code such as, for example, a matrix code, which has been made available to a user of the mobile device 101. Generally, a "QR code" may refer to a matrix barcode (e.g., two-dimensional code) that is readable by scanners, mobile phones, or other electronic device with optical capabilities, which employs geometrical patterns to convey information as a printed pattern of black and white image. The QR codes may be presented to users of the mobile device 101 on or in conjunction with, for example, billboard ads, in-store displays, business cards, advertisements, and coupons, and may be in print form or in electronic form such as, for example, a television system, a personal computer monitor, a display of a car navigation system or any other electronic device that is capable of displaying a picture being composed of a plurality of images in a time series.

In various embodiments, QR codes may be provided to a user on a display device (e.g., a cathode ray tube display, a liquid crystal display, a plasma display, a computer monitor, etc.) that displays audio/visual content received from an electronic device (e.g., a set top box, a television receiver, etc.). The audio/visual content (e.g., television programming, video on demand, etc.) may be received by the electronic device from a content provider (e.g., a cable television provider, a satellite television provider, a video on demand provider, etc.).

In some embodiments, the content received from the content provider may include one or more QR codes. Alternatively, or additionally, the electronic device that receives the content from the content provider may generate one or more QR codes for incorporation into the content. For example, the electronic device may be a set top box that receives content from a television provider, and the electronic device may generate QR codes that are selectively overlaid on and/or combined with the content provided by the television provider and subsequently displayed to users on the display device.

In some embodiments, the information encoded in the QR code ("code data") may relate to a particular business entity or business entity facility such as, for example, identifying information (e.g., name, unique ID) and/or address information (e.g., street address). Alternatively, the code data may include any information relating to the particular business entity. In further alternatives, the code data may include information relating to a category of business entities (e.g., Honda dealerships, Italian restaurants, etc.) In embodiments in which the code data includes address information, the code data may include, for example, address information for each or a portion of a plurality of facilities of a particular business entity. Alternatively, as will be discussed in further detail below, the relevant address information or a portion of the relevant address information may only be available to the mobile device 101 over the network 109.

In various embodiments, the code data may also include information for transmitting information to the server 107. For example, the code data may include information regarding how the mobile device 101 will transmit the information to the server 107 (such as including a web address, network address, or the like) such that the mobile device 101 may automatically transmit the relevant code data to the server 107. Alternatively, information regarding how the mobile device 101 will transmit the information to the server 107 may be previously stored to a database accessible to the one or more processing units 115. For example, a user of the mobile device 101 may input the information, such as via a user interface of the mobile device 101, or the information may be stored to a storage device accessible to the one or more processing units 115 in conjunction with the installation of one or more software applications.

In illustrative embodiments, the processing unit 115 may be configured such that when a user of the mobile device 101 utilizes the optical reading device 103 to detect and/or record a QR code, the processing unit 115 may decode the QR code to obtain the code data, and may automatically initiate a request to the server 107, based at least in part on the code data, to provide location information pertaining to a particular business entity identified in the code data. Alternatively, the processing unit 115 may store the code data to a database accessible to the processing unit 115, and a request to server 107 may be initiated after manual prompting by a user of the mobile device 101. While the foregoing has been described with respect to embodiments in which the processing unit 115 decode the QR code, it is to be appreciated that the processing unit 115 may transmit the "raw" image data constituting the QR code to another electronic device communicably coupled to the mobile device 101 for decoding such as, for example, to the server 107.

In various embodiments, the mobile device 101 may include a position determination system, or GPS receiver 105 that determines the location of the mobile device 101. The GPS receiver 105 may be integrated into the mobile device 101 or provided as a separate component in communication with the mobile device 101 (e.g., a GPS navigational device in communication with the mobile device 101). Generally, the GPS receiver 105 may determine a location of the mobile device in terms of parameters such as latitude, longitude, height, speed of travel, and other useful location or position parameters ("GPS data")." While the present disclosure is described with respect to embodiments in which the position determination system employs GPS technology, it is to be understood that any suitable position determination systems such as, for example, triangulation systems, are within the scope of the present disclosure. In various embodiments, after a user of the mobile device 101 utilizes the optical reading device 103 to detect a QR code, the processing unit 115 may retrieve GPS data of the mobile device 101 and may transmit the retrieved GPS data, along with the code data, to the server 107. Alternatively, the code data and the GPS data may be provided in separate transmissions and appropriately linked.

In some embodiments, the GPS data retrieved by the processing unit 115 may include data with respect to the current geographic location of the mobile device 101. Alternatively, or additionally, the GPS data retrieved by the processing unit 115 may include reference GPS data which has been previously stored to a storage device accessible to the processing unit 115. For example, in one embodiment, users of the mobile device 101 may establish reference geographic locations such as, for example, relating to the geographic location of a users primary residence, place of work, or other location of relevance to the user.

In illustrative embodiments, the mobile device 101 may communicate with other devices via a network 109. The network 109 may be a cellular network, satellite network, Bluetooth network, Wi-Fi network, or any other wireless communication network. In addition to communication with other wired or wireless communication devices, the network 109 may permit communication between the mobile device 101 and the server 107.

In various embodiments, the server 107 may be configured to receive information from the mobile device 101. For example, the server 107 may be configured to receive requests from the mobile device 101 to provide location information pertaining to a particular business entity. As discussed above, the request may transmitted from the mobile device 101 and include, for example, code data obtained from a machine readable code (e.g., QR code). The code data may include, for example, information that identifies a particular business entity or a category of business entities. The request may further include GPS data obtained by the GPS receiver 105 associated with the mobile device 101.

In some embodiments, subsequent to receiving a request from the mobile device 101, the server 107 may process the request. Processing of the request may include, for example, any or all of: identifying a particular business entity or category of business entities from the code data; retrieving address data accessible to the server 107 relating to one or more geographic locations of the particular business entity or business entities in the category; and relating and/or comparing the retrieved address data to the GPS data; as well as similar operations.

In illustrative embodiments, based at least in part on the processed request, the server 107 may generate a response for transmission back to the mobile device 101. The response may include information relating to the geographic locations of a particular business entity identified in the code data, or a particular business entity from the category identified in the code data. For example, the response may include address information (e.g., street address) and/or navigation information with respect to one or more of the identified business entity's facilities. The navigation information may include text instructions for reaching a particular location, a combination of textual and graphical information for reaching a particular location, a map segment, an icon that represents a location of the mobile device 101 or one or more reference locations on the map segment, an icon that represents a location of an identified location of the particular business entity on the map segment, and/or other navigation information.

In embodiments in which the business entity identified in the code data operates a plurality of facilities or in which a category (e.g., Honda dealerships) identified in the code data corresponds to a plurality of facilities, the server 107 may identify the closest facility, or identify one or more of the facilities within a pre-defined proximity relative to the GPS data. In embodiments in which the server 107 identifies facilities within a pre-defined proximity, the server 107 may additionally categorize the identified facilities such as by, for example, distance, travel time, and the like.

In some embodiments, the server 107 may transmit the response to the mobile device 101 such that the location and/or navigation information may be presented to the user via the one or presentation devices 119 of the mobile device 101 and/or a presentation device of a electronic device communicably coupled to the mobile device 101. The response may be configured such that it is presentable via the one or more presentation devices textually, graphically, audibly, or any combination thereof. The server 107 may include one or more processing units which execute instructions stored in one or more non-transitory storage media in order to perform the above described functions. The server 107 may also include or be in communication with one or more databases 111 having data relating to the geographical locations of the business entities for which the QR codes of the present disclosure have been created, which may be retrieved by the server 107. While the foregoing has been described with respect to embodiments in which the processing operations are carried out by a single server 107, it is to be appreciated that the processing operations could be carried by any number of servers that are communicably coupled.

In some embodiments, the server 107 may interface with one or more third party services accessible over the network 109 to generate the location and/or navigation information. For example, portions of the location and/or navigation information may be supplied to the server 107 by an online supplier of maps and directions (e.g., MapQuest, GoogleMaps, etc.).

In alternative embodiments, one or more of the processing operations described above as being carried out by the server 107 may be carried out by the mobile device 101. For example, in embodiments in which the response communicated from the server 107 includes only address data, the processing unit 115 of the mobile device 101 may be configured to relate GPS data to the address data, and/or generate location and/or navigation information to one or more facilities of the particular business entity. Alternatively, the mobile device 101 may be in communication with a GPS navigation device (e.g., handheld, integrated vehicle) which may perform one or more of the processing operations. For example, the mobile device 101 may communicate address data received from the server 107 to the GPS navigation device and the GPS navigation device may relate GPS data to the address data and/or generate location and/or navigation information for display to a user.

In further alternatives, the mobile device 101 may be configured to provide location and/or navigation information in the absence of communication with the server 107. For example, in embodiments in which all or a portion of the relevant address information is embedded in the QR code, either or both of the mobile device 101 and a GPS navigation device in communication with the mobile device may be configured to relate GPS data to the address data supplied by the QR code and/or generate location and/or navigation information for display to a user.

Figure 2:
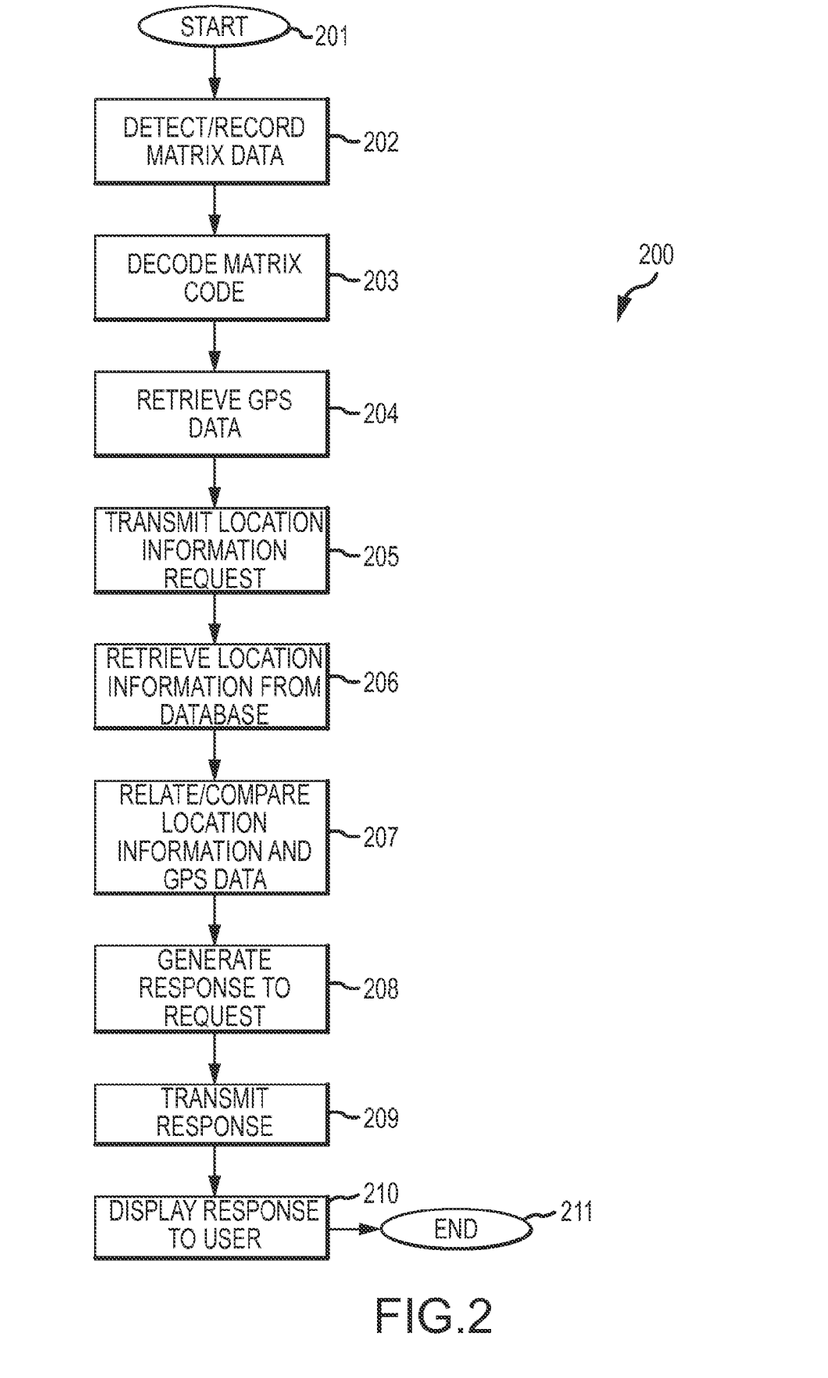
FIG. 2 is a flow chart illustrating a method for providing a user with location and/or navigational information with respect to one or more of a business entity's facilities in accordance with some embodiments of the present disclosure. This method may be performed by the system of FIG. 1.

FIG. 2 illustrates a method 200 for providing a user with location and/or navigational information with respect to a business entity and/or one or more of the business entity's facilities in accordance with some embodiments of the present disclosure. The method 200 may be performed by the system 100 of FIG. 1. The flow begins at block 201 and may proceed to block 202 where a user of the mobile device 101 may employ the optical reading device 103 to detect and/or record a matrix code, which has been made available to a user of the mobile device 101. As discussed above, the matrix code may be provided in print or electronic form on or in conjunction with, for example, an advertisement. The flow then proceeds to block 203 where the one or more processing units 115 of the mobile device 101 decode the matrix code. Decoding the detected matrix code may include, for example, decoding information regarding a specific business entity or business entity facilities and/or information regarding how the mobile device 101 will transmit a request to the server 107. The flow may then proceed to block 204 where the mobile device retrieves GPS data. The GPS data may be retrieved from the GPS receiver 105 (e.g., current GPS data)

and/or one or more storage devices accessible to the processing units 115 (e.g., reference GPS data).

At block 205, the processing units 115 may transmit a request to the server 107 to provide information regarding the geographic location of a business entity identified from the code data. The request may include, for example, information identifying the business entity and/or GPS data. Upon receipt of the request at the server 107, the flow may proceed to block 206 where the server 107 retrieves information from the databases 111 regarding the geographic location of one or more facilities of the identified business entity. The flow may then proceed to block 207.

At block 207, the server 107 may relate and/or compare the geographic location information of one or more facilities of the identified business entity to the GPS data. The flow may then proceed to block 208 where the server 107 may, based at least in part on the comparison, generate a response to the request that includes, for example, location and/or navigation information with respect to one or more facilities of the business entity identified from the code data. For example, the request may include a street address of one or more facilities and/or textual and/or graphical navigational instructions to reach one or more of the facilities. The flow may then proceed to block 209.

At block 209, the server 107 may transmit the response to the processing unit 115 of the mobile device 101. The flow may then proceed to block 210 where the processing units 115 receives and subsequently transmits at least the portion of the response corresponding to the location and/or navigational information the to the presentation device 119, or to another electronic device in communication with the mobile device 101 (e.g., GPS navigational device) for display to a user. The flow may then proceed to block 211 and end.

It should be understood that the specific steps as well as the specific order or hierarchy of steps described in method 200 is an example of a sample approach. In other implementations, some of the specific steps as well as the specific order or hierarchy of steps in the method may be rearranged while remaining within the disclosed subject matter.

Figure 3A:
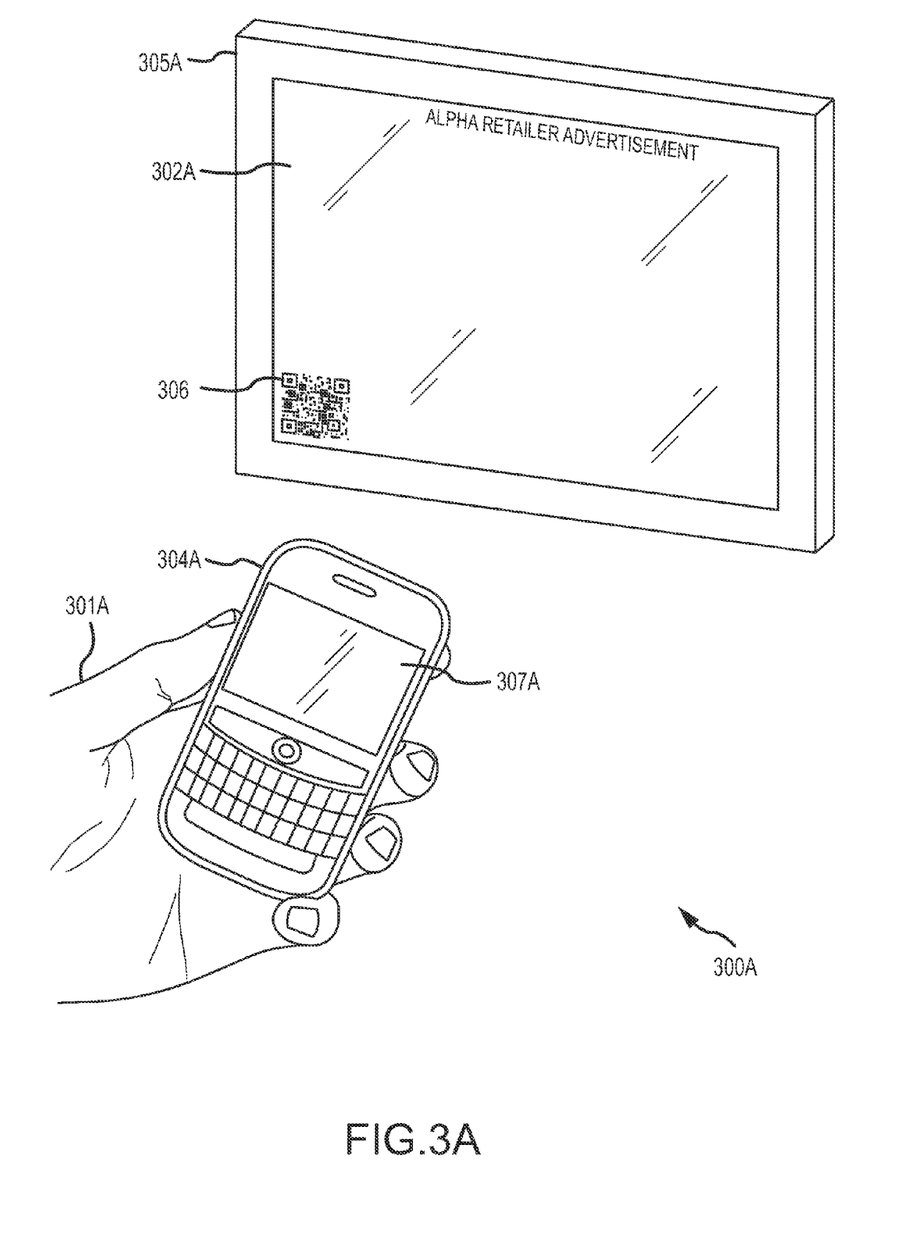
FIGS. 3A-3B are diagrams illustrating an example system for providing a user of an electronic device with information regarding the geographic location of a business entity facility. The system may be the system of FIG. 1.
Figure 3B:
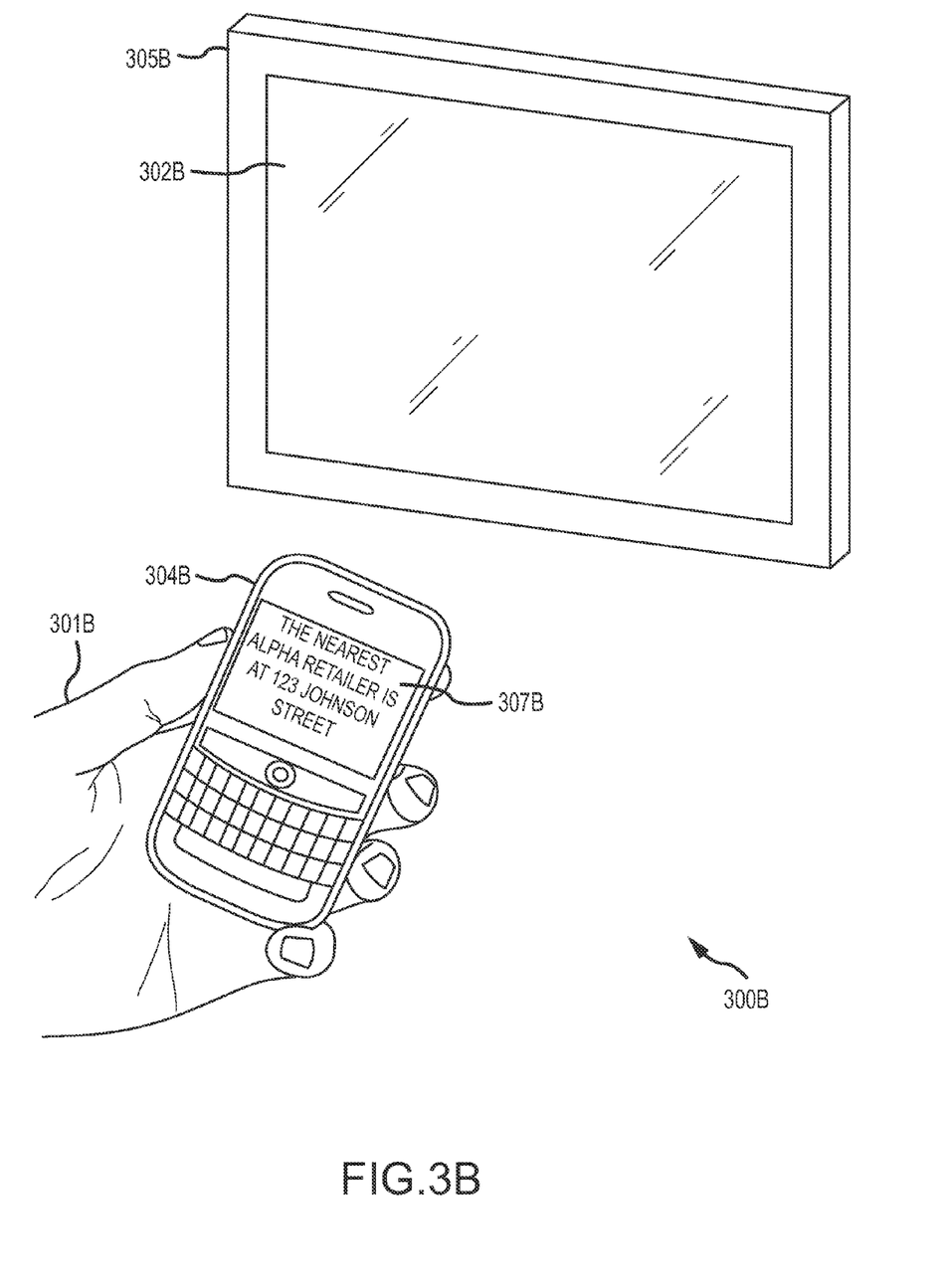

FIGS. 3A-3B illustrate an example system 300A-300B for providing a user 301A-301B of a mobile device 304A-304B device with information regarding the geographic location of a business entity. The system may be the system of FIG. 1. As illustrated in FIG. 3A, a user 301A is viewing an advertisement of a business entity that is being displayed on a television screen 302A of a television 305A. Also as illustrated, the user 301A possesses a mobile device 304A which he may utilize to capture one or more matrix codes 306 displayed in conjunction with the television advertisement. The mobile device 304A is equipped with a GPS receiver that determines the location of the mobile device 304A. In order to receive information regarding the geographic location of the advertising business entity, the user 301A takes a picture of the QR code 306 on the screen 302A of the television 305A with the mobile device 304A that is executing a QR code reader program. The QR code reader program detects and decodes the QR code. Based on the decoded information, the mobile device 304A transmits decoded information specific to the advertising business entity and information received from the GPS receiver to a server. The server may process the information received from the mobile device 304A and generate a response related to a geographic location of the advertising business entity that is nearest to the user. FIG. 3B depicts a response received by the mobile device 304B and displayed to the user 301B on a display screen 307B.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for providing a user of a mobile electronic device with information regarding the geographic location of a business entity, the method comprising:
    detecting, utilizing the mobile electronic device, a matrix code displayed with an advertisement for the business entity, wherein the matrix code is encoded with data relating to the business entity;
    decoding, at the mobile electronic device, the matrix code to retrieve the data relating to the business entity
    retrieving, utilizing the mobile electronic device, global positioning system (GPS) data relating to at least one of a current geographic location of the electronic mobile device or a reference geographic location;
    generating, utilizing the mobile electronic device, a request for location the business entity, the request for location information including business entity identifying information retrieved from the decoded code and the GPS data previously retrieved;

transmitting over a network, utilizing the mobile electronic device, the request for location information to a server for processing;

receiving at the mobile electronic device, a response to the request, wherein the response comprises the geographic location of one or more establishments of the business entity from a plurality of establishments of the business entity, wherein the one or more establishments from the plurality of establishments are selected within a predefined proximity relative to the retrieved GPS data relating to at least one of the current geographic location of the electronic mobile device or the reference geographic location; and displaying, utilizing the mobile electronic device or an electronic device communicatively coupled to the mobile electronic device, the response, wherein the display categorizes the one or more establishments by one or both of distance and travel time.

2. The method of claim 1, further comprising processing, utilizing the server, the request for location information.

3. The method of claim 2, wherein the business entity identifying information comprises a unique identifier.

4. The method of claim 3, further comprising retrieving, utilizing the server, information regarding the geographic location of the business entity from a storage device accessible to the server.

5. The method of claim 4, wherein processing the request for location information comprises comparing the information regarding the geographic location of the business entity to the GPS data.

6. The method of claim 5, further comprising generating, utilizing the server, a response to the request based at least in part on the comparison.

7. The method of claim 1, wherein generating the request is carried out automatically after the matrix code is detected.

8. The method of claim 1, wherein the matrix code comprises a quick response (QR) code.

9. The method of claim 1, wherein the mobile device is a wireless communications device.

10. The method of claim 1, wherein the retrieved GPS data relates to a reference geographic location previously established by a user, and saved in the mobile electronic device, for use in the request, and further wherein the establishment from the plurality of establishments is selected based on its proximity to the reference geographic location.

11. The method of claim 1, wherein the matrix code is detected on a display device that displays matrix codes received electronically from a content provider.

12. A system for providing location information pertaining to a particular business entity, comprising:

a mobile device comprising:

an optical input device configured to optically detect a machine readable code, wherein the machine readable code includes information relating to the particular business entity;

a position determination system configured to acquire global positioning system (GPS) data; and a processing unit communicably coupled to the optical input device and the position determination system;

wherein the processing unit is provided with computer implemented instructions to:

decode the machine readable code;

generate for transmission over a network a request that includes at least a portion of the information relating to the particular business entity from the decoded machine readable code and the GPS data previously acquired;

transmit over the network the request for location information to a server for processing;

receive a response to the request, wherein the response comprises the geographic location of one or more establishments of the business entity from a plurality of establishments of the business entity, wherein the one or more establishments from the plurality of establishments are selected within a predefined proximity relative to the retrieved GPS data; and display the response, wherein the display categorizes the one or more establishments by one or both of distance and travel time.

13. The system of claim 12, further comprising a server communicably coupled to the processing unit and configured to receive the location information request and based at least in part on the information relating to the particular business entity and the GPS data, generate a response that includes location information for the particular business entity.

14. The system of claim 12, wherein the GPS data comprises either or both of GPS data corresponding to the current geographical location of the mobile device and GPS data corresponding to a reference geographical location.

15. The system of claim 12, wherein the machine readable code comprises a quick response (QR) code.

16. The system of claim 15, wherein the QR code is encoded with information for identifying the particular business entity.

17. The system of claim 15, wherein the QR code is encoded with information for transmitting the request to the server.

18. The system of claim 12, wherein the response includes either or both of address information and navigation information with respect to one or more facilities of the particular business entity.

19. The system of claim 12, wherein the response is generated automatically upon detection of the machine readable code.

20. The system of claim 12, wherein the mobile device is a wireless communications device.

* * * * *